United States Patent
Yerakaraju et al.

(10) Patent No.: US 12,347,208 B2
(45) Date of Patent: Jul. 1, 2025

(54) REAL-TIME OBJECT DETECTION FROM DECOMPRESSED IMAGES

(71) Applicant: NETRADYNE, INC., San Diego, CA (US)

(72) Inventors: Suresh Kumar Yerakaraju, Bengluru (IN); Shravan Kumar Motuti, Hyderabad (IN); Hitesh Gupta, Delhi (IN); Praveen Mathad, Bangalore (IN); Arvind Yedla, La Jolla, CA (US); Venkata Sreekanta Reddy Annapureddy, San Diego, CA (US)

(73) Assignee: Netradyne, Inc., San Diego, CA (US)

( * ) Notice: Subject to any disclaimer, the term of this patent is extended or adjusted under 35 U.S.C. 154(b) by 0 days.

(21) Appl. No.: 18/860,026

(22) PCT Filed: Aug. 21, 2023

(86) PCT No.: PCT/US2023/030714
§ 371 (c)(1),
(2) Date: Oct. 25, 2024

(87) PCT Pub. No.: WO2024/049670
PCT Pub. Date: Mar. 7, 2024

(65) Prior Publication Data
US 2025/0131738 A1    Apr. 24, 2025

Related U.S. Application Data

(60) Provisional application No. 63/401,746, filed on Aug. 29, 2022.

(51) Int. Cl.
*G06V 10/00*    (2022.01)
*G06V 10/70*    (2022.01)
*G06V 20/58*    (2022.01)

(52) U.S. Cl.
CPC .............. *G06V 20/58* (2022.01); *G06V 10/70* (2022.01)

(58) Field of Classification Search
CPC ........ G06N 20/00; G06N 20/10; G06N 20/20; G06V 10/70; G06V 20/58
See application file for complete search history.

(56) References Cited

U.S. PATENT DOCUMENTS 10,474,904 B1 * 11/2019 Correnti ................. B60Q 9/002
10,944,996 B2    3/2021 Bortman et al.
(Continued)

OTHER PUBLICATIONS

International Preliminary Report on Patentability in International Patent Application No. PCT/US23/30714 dated Oct. 16, 2024, 5 pages.
(Continued)

*Primary Examiner* — Amir Alavi
(74) *Attorney, Agent, or Firm* — Foley & Lardner LLP

(57) ABSTRACT

A system or method trains and implements a machine learning model for object detection. A first computing device remote to a vehicle trains a machine learning model by receiving a decoded set of previously encoded training image data and training the machine learning model to detect objects within images based on the decoded set of training image data. A processor of a second computing device encodes at least one image captured by a camera, decodes the encoded image, and executes the machine learning model to extract a set of objects from the decoded image.

19 Claims, 7 Drawing Sheets

(56) References Cited

U.S. PATENT DOCUMENTS

| | | | |
|---|---|---|---|
| 10,970,645 B1 | 4/2021 | Kim et al. | |
| 11,380,108 B1* | 7/2022 | Cai | G06N 3/08 |
| 11,423,527 B2* | 8/2022 | Krueger | G06T 7/80 |
| 11,802,968 B2* | 10/2023 | Gupta | H04W 4/44 |
| 11,935,258 B2* | 3/2024 | Green | H04N 23/672 |
| 2019/0005358 A1 | 1/2019 | Pisoni | |
| 2019/0279020 A1* | 9/2019 | Magzimof | H04N 19/17 |
| 2019/0287024 A1 | 9/2019 | Briggs et al. | |
| 2020/0389672 A1 | 12/2020 | Kennett et al. | |
| 2022/0058484 A1 | 2/2022 | Meier et al. | |
| 2022/0116052 A1 | 4/2022 | Silberman et al. | |
| 2024/0078679 A1* | 3/2024 | Tsai | G06T 7/11 |
| 2024/0095937 A1* | 3/2024 | Unger | G06T 7/50 |
| 2024/0119706 A1* | 4/2024 | Jnawali | G06V 20/46 |
| 2024/0127416 A1* | 4/2024 | Schmidt | G06T 7/0002 |
| 2024/0185092 A1* | 6/2024 | Beaurepaire | G06N 20/00 |
| 2024/0338951 A1* | 10/2024 | Saggu | G06V 10/267 |

OTHER PUBLICATIONS

International Search Report and Written Opinion in International Patent Application No. PCT/US23/30714 dated Nov. 6, 2023, 8 pages.
Extended European Search Report in EP Patent Application No. 23861101.6 dated Apr. 1, 2025, 9 pages.
Talebi, et al., "Learning to Resize Images for Computer Vision Tasks," 2021 IEEE/CVF International Conference on Computer Vision (ICCV), Oct. 10, 2021, pp. 487-496, XP034093349, DOI: 10.1109/ICCV48922.2021.00055.

* cited by examiner

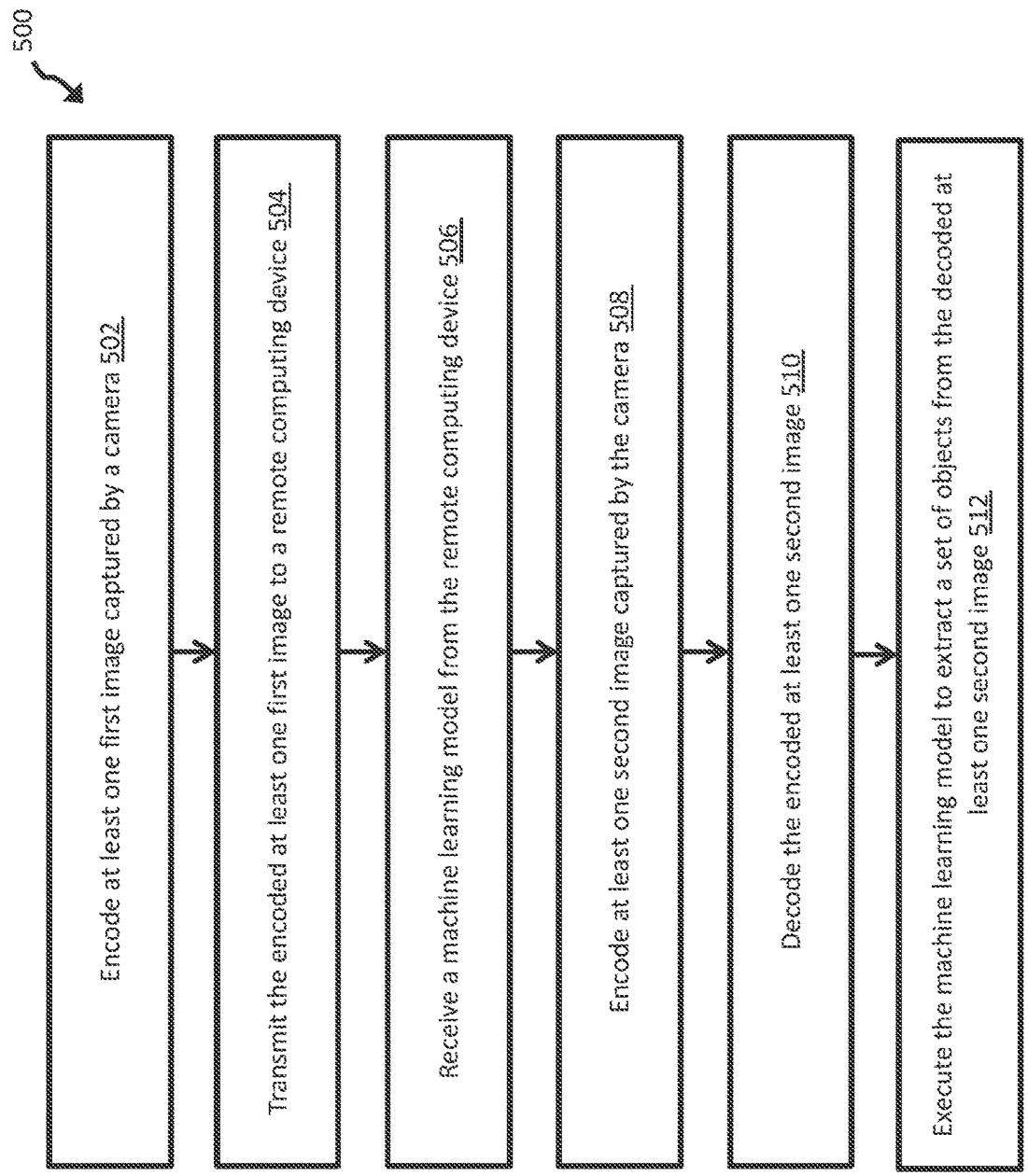

REAL-TIME OBJECT DETECTION FROM DECOMPRESSED IMAGES

CROSS REFERENCE

This application is a U.S. National Phase Application under 35 U.S.C. § 371 of International Patent Application No. PCT/US2023/030714, filed on Aug. 21, 2023, which claims the benefit of and priority to U.S. Provisional Patent Application No. 63/401,746, filed on Aug. 29, 2022, and entitled REAL-TIME OBJECT DETECTION FROM DECOMPRESSED IMAGES, the contents of which are incorporated herein by reference in their entireties.

TECHNICAL FIELD

This application relates generally to training a machine learning model to detect objects within decompressed images.

BACKGROUND

Vehicles may implement machine learning techniques on images to detect objects on the road. Such detection can be helpful for self-driving or for otherwise alerting a driver of upcoming obstacles. However, it is challenging to ensure machine learning models that are used for such object detection are adequately trained.

SUMMARY

Gathering enough training data to adequately train machine learning models for object detection from images that are captured by cameras mounted to a car can be difficult. Some conventional attempts to do so often involve using cameras mounted to vehicles to capture images of the road as the vehicles are driving. The images can be transmitted to a cloud server, where they can be used for training. Because such images can be captured and transmitted from multiple vehicles, the cloud server may have enough images and enough image diversity to train machine learning models for object detection from images.

In some conventional attempts, images used for training of machine learning models are not the same as the images used for object detection, and this discrepancy may lead to inaccurate results. For example, to lower the bandwidth usage and cost of transmitting images to the cloud server for model training, the images may first be encoded (e.g., compressed). The cloud server may receive and decode (e.g., decompress) the encoded images and use the decoded images to train a machine learning model. Encoding and decoding the images can cause information losses in the images, such as causing edges of the images to be blurry compared to the edges in the raw versions of the images (e.g., versions of the images before they were encoded and decoded). Accordingly, when the encoded and decoded images are used to train a machine learning model for object detection, the machine learning model may be trained to detect objects in images with objects that have blurry edges. When the machine learning model is deployed to a vehicle for real-time object detection on raw images, the machine learning model may not detect objects in the images accurately compared to how the machine learning model detects objects in the encoded and decoded training images.

Implementations of the systems and methods described herein may overcome the aforementioned technical problem and train and implement machine learning models that can accurately detect objects from images in real-time (e.g., as vehicles are driving down the road). To do so, for example, a computing system may generate training images that are similar to the images that are input into machine learning models once the machine learning models have been provisioned to vehicles for real-time use. For instance, to train a machine learning model, a processor mounted in a vehicle may receive captured images from a camera attached to the vehicle. The processor may encode (e.g., compress) the captured images to lower the bandwidth requirements of transmitting the image across a network and transmit the encoded image to a cloud server. The cloud server may decode (e.g., decompress) the encoded image and train the machine learning model for object detection with the decoded image.

To improve the accuracy of real-time object detection of a machine learning model for when the machine learning model is trained and provisioned, the processor may process the images that are used for real-time object detection similar to how the training images were processed. For example, the machine learning model trained as described above may be provisioned to the vehicle for real-time object detection. The processor mounted in the vehicle may receive the machine learning model. The processor may receive images from the camera of the vehicle. The processor may encode and decode the real-time images using the same or similar encoding and decoding techniques to the encoding and decoding techniques that were used to process the training images. Because the real-time images were manipulated in a similar manner to the images on which the machine learning model was trained, the machine learning model may more accurately detect objects within the real-time image. Further, given the similarities in processing of the training images and the real-time images, it can be easier to determine how accurate the machine learning model will be upon being provisioned or deployed to a vehicle.

One embodiment is directed to a method for training and implementing a machine learning model for object detection, wherein a first computing device remote to a vehicle trained the machine learning model by receiving a decoded set of previously encoded training image data; and training the machine learning model to detect objects within images based on the decoded set of training image data. The method may include encoding, by at least one processor of a second computing device in communication with a camera mounted on or in the vehicle, at least one image captured by the camera; decoding, by the at least one processor, the encoded at least one image; and executing, by the at least one processor, the machine learning model to extract a set of objects from the decoded at least one image.

The first computing device may have trained the machine learning model by decoding the encoded set of training image data from a compressed format into a decompressed format. In such cases, encoding the at least one image may comprise encoding, by the at least one processor, the at least one image into the compressed format, and decoding the encoded at least one image comprises decoding, by the at least one processor, the encoded at least one image into the decompressed format. The first computing device may have trained the machine learning model by decoding the encoded set of training image data using a software decoder. Decoding the encoded at least one image may comprise decoding, by the at least one processor, the encoded at least one image using a hardware decoder.

The first computing device may have trained the machine learning model by changing a size of each of the decoded set of training image data from a first size to a second size.

Training the machine learning model may include using the decoded set of training image data in the second size. The method may further include changing, by the at least one processor, a size of the decoded at least one image from the first size to the second size. Executing the machine learning model may include executing, by the at least one processor, the machine learning model using the decoded at least one image in the second size. The first computing device may have trained the machine learning model by changing the size of each of the decoded set of training image data using a first software resizer. Changing the size of the encoded at least one image may include changing, by the at least one processor, the size of the encoded at least one image using the first software resizer, a second software resizer, or a hardware resizer.

Executing the machine learning model may include executing, by the at least one processor, the machine learning model to extract a set of objects from the decoded at least one image in real time as the vehicle is driving. Receiving the at least one image from the camera may include receiving, by the at least one processor, a video comprising a plurality of images including the at least one image, and wherein decoding the at least one image comprises decoding, by the at least one processor, the at least one image in response to selecting the at least one image from the plurality of images according to one or more selection rules. Selecting the at least one image according to the one or more selection rules may include selecting, by the at least one processor, the at least one image by identifying the at least one image at a set interval of images in the plurality of images.

The method may include determining, by the at least one processor, a change in vehicle operation of the vehicle based on the extracted set of objects; and transmitting, by the at least one processor, the change in vehicle operation of the vehicle to a second processor controlling the vehicle, the second processor controlling the vehicle according to the change in vehicle operation. The second computing device may be mounted on or in the vehicle.

Another embodiment is directed to a system for training and implementing a machine learning model for object detection. The system can include a remote processor of a first computing device remote from a vehicle, the remote processor coupled to a remote non-transitory memory of the first computing device. The remote processor can be configured to receive an encoded set of training image data; decode the encoded set of training image data; and train a machine learning model to detect objects within images based on the decoded set of training image data; and an on-board processor of a second computing device in communication with an on-board non-transitory memory of the second computing device and a camera mounted on or in the vehicle. The on-board processor of the second computing device can be configured to encode at least one image captured by the camera; decode the encoded at least one image; and execute the machine learning model to extract a set of objects from the decoded at least one image.

The remote processor can be further configured to transmit the machine learning model to the on-board processor across a network. The remote processor can be further configured to transmit the machine learning model to the on-board processor responsive to determining the machine learning model has an accuracy above an accuracy threshold on decoded input data. The remote processor can be configured to decode the encoded set of training image data by decoding the encoded set of training image data from a compressed format into a decompressed format. The on-board processor can be configured to encode the at least one image by encoding the at least one image into the compressed format; and decode the encoded at least one image by decoding the encoded at least one image into the decompressed format.

The remote processor can be configured to decode the encoded set of training image data using a software decoder. The on-board processor can be configured to decode the encoded at least one image by decoding the encoded at least one image using a hardware decoder.

Another embodiment is directed to a method for training and implementing a machine learning model for object detection. The method may include encoding, by at least one processor of a computing device in communication with a camera mounted on or in a vehicle, at least one first image captured by the camera; transmitting, by the at least one processor, the encoded at least one first image to a remote computing device remote from the at least one processor, the remote computing device or a second computing device decoding the encoded at least one first image and training, with the decoded at least one first image, a machine learning model to extract objects within images; receiving, by the at least one processor, the machine learning model from the remote computing device or the second computing device; encoding, by the at least one processor, at least one second image captured by the camera coupled to the vehicle; decoding, by the at least one processor, the encoded at least one second image; and executing, by the at least one processor, the machine learning model to extract a set of objects from the decoded at least one second image.

The method can include encoding the at least one first image comprises encoding, by the at least one processor, the at least one first image by executing an encoder. Encoding the at least one second image can include encoding, by the at least one processor, the at least one second image by executing the encoder. Receipt of the encoded at least one first image can cause the remote computing device to decode the encoded at least one first image from a compressed format into a decompressed format. Encoding the at least one second image can include encoding, by the at least one processor, the at least one second image into the compressed format, and decoding the encoded at least one second image can include decoding, by the at least one processor, the encoded at least one second image into the decompressed format. Receipt of the encoded at least one first image can cause the remote computing device to decode the encoded at least one first image using a software decoder. Decoding the encoded at least one second image can include decoding, by the at least one processor, the encoded at least one second image using a hardware decoder.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer-readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure. For purposes of clarity, not every component may be labeled in every drawing. In the drawings:

FIG. 5 illustrates a flow of a method for training a machine learning model for object detection, according to an embodiment.

DETAILED DESCRIPTION

Figure 1:
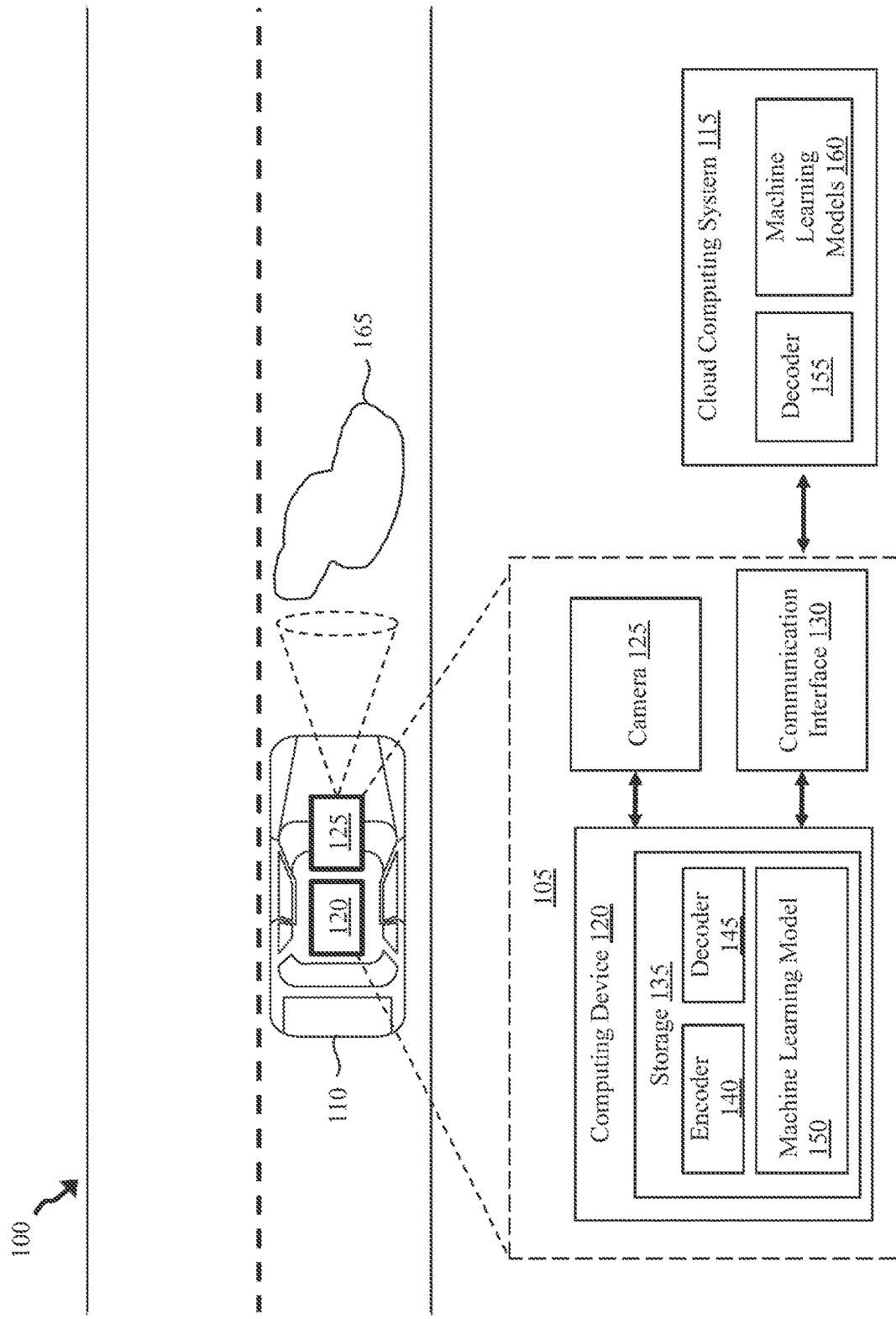
FIG. 1 illustrates an example environment showing a computing system for training and using a machine learning model for object detection, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

As mentioned above, gathering enough training data to adequately train machine learning models for object detection from images that are captured by cameras attached to a car can be difficult. Previous and current attempts to do so often involve using cameras attached to vehicles to capture images of the road as the vehicles are driving. The images can be transmitted to a cloud server, where they can be used for training. Because images can be captured and transmitted from multiple vehicles, the cloud server may have enough images, and may have enough image diversity due to differences in camera positioning associated with different vehicles, to train machine learning models for object detection from images.

A technical problem that arises when transmitting images from vehicles to the cloud server is that transmitting images to the cloud server can require a significant amount of bandwidth, particularly when the images are images (e.g., frames) of videos that are continuously transmitted to the cloud server or transmitted as a large data file. To resolve this technical problem, on-board processors of the vehicles can encode the images before transmitting the images to the cloud server. The encoding may lower the size (e.g., the number of bytes in the images) of the images such that the images require less bandwidth during transmission. The cloud server may receive the encoded images and decode the encoded images. The cloud server may then use the decoded images to train a machine learning model for object detection.

Because images are compressed and decompressed for training, it can be difficult to adequately train machine learning models before provisioning the machine learning models to vehicles for real-time use. For example, compressing and decompressing raw images can cause the resulting decompressed images to be blurry (e.g., have less precise edges) compared to the raw images that were initially captured by cameras attached to the vehicles. Accordingly, when the machine learning models are trained by the cloud server, the machine learning models may be trained by blurry images that are slightly different from the raw images that are captured by the cameras on the vehicles. Because the machine learning models are trained based on blurry images, the machine learning models may not be able to accurately detect objects in raw images that the cameras on the vehicles create when the machine learning models have been provisioned to the vehicles for real-time use. Further, because of the difference in quality between the training data and real-time data, it can be difficult to determine how accurate the machine learning models will be when the models are transmitted to the vehicles (e.g., the machine learning model may perform differently with the decoded training data than the raw real-time data).

There are a few solutions for resolving the problem relating to solving the aforementioned disconnect between the training image data and real-time image data. In one example, a computer can introduce statistical errors to the training images (e.g., the training frames) so the machine learning model can support field (e.g., real-time) data. However, the introduced noise may not adequately represent a live image (e.g., an image the processor receives and process in real time) and the machine learning model may still not be sufficiently trained to analyze live images. In another example, a computer can accept the loss of semantic information and covariate shift (e.g., the change between the distribution of input data between the training environment and the live environment). This solution may result in a drop in performance below a tolerable range. In another example, a computer can adjust the compression rate or technique before the images are transmitted to a cloud computer for training. However, this solution may incur higher bandwidth usage. In another example, a computer can introduce image restoration on compressed/encoded images with generative adversarial networks (GANs) in an offline mode. This method can help alleviate the negative effects of compression on the downstream visual task, but incur an overhead of using GANs and also makes the whole processing GAN dependent.

A processor implementing the systems and methods described herein may overcome these technical deficiencies by processing images for real-time object detection using a machine learning model in a similar manner to the processing that is used to train the machine learning model. For example, to train the machine learning model, the processor may receive captured images from a camera attached to a vehicle. The processor may encode the captured images and transmit the encoded images to a cloud server. The cloud server may receive and decode the encoded images. The cloud server may then train, using the decoded images, a machine learning model to detect objects from images. The cloud server may train the machine learning model using images collected from multiple vehicles. The cloud server may transmit the trained machine learning model to the processor of the vehicle. The processor may receive the machine learning model to use to detect objects as the vehicle is driving or is parked in place (e.g., is parked and in an asset protection or surveillance mode).

To use a machine learning model to detect objects, the processor may process the raw images the processor receives from the camera mounted to or in the vehicle. For example, upon receiving an image from the camera, the processor may encode the image using the same or a similar encoding technique to the technique the processor used to encode the images the processor transmitted to the cloud server for training. After encoding the image, the processor may decode the image using the same or a similar technique to the decoding technique the cloud server used to decode the encoded training images. The cloud server may send the encoding and/or decoding techniques to be used in association with the model to the processor(s) in the computing device, which may depend on the resources available at the computing device. The processor may then execute the machine learning model to detect objects within the image using the decoded image as input. Because the processor encoded and decoded the image in the same or a similar manner to how the training images were encoded and decoded, the machine learning model may more accurately detect objects from the image compared to machine learning models that were trained using encoded and decoded images and then provisioned (e.g., transmitted) for object detection of raw images.

In addition to training machine learning models to more accurately detect objects in images in real-time, implementing the systems and methods described herein may enable a cloud server or an operator of the cloud server to more accurately determine if and/or when to provision a machine learning model to a vehicle for real-time object detection. For example, because the systems and methods described herein enable a machine learning model to be trained based on images that are similarly processed to images the machine learning model will use for real-time object detection, the output results of the model during the validation and testing phases of training may more accurately represent how the machine learning model will perform upon being provisioned. Accordingly, the cloud server or an operator of the cloud server may trust the results of the validation and testing phases of training to make better judgments as to when the machine learning model is adequately trained to be provisioned.

A computing device can analyze images captured from a camera attached to or in a vehicle in a real-time driving environment. In a non-limiting example, the computing device can receive images from a camera located in a housing (e.g., a plastic, metal, or other solid material that can store or hold the camera) inside a cabin of a vehicle. The computing device can be inside or local to the vehicle. The computing device can encode and decode the images to generate decoded images similar to training images that were encoded and decoded to train a machine learning model for object detection. The computing device can insert the decoded images into the machine learning model and execute the machine learning model to detect objects within the decoded images. FIG. 1 depicts an example environment that includes example components of a system in which such a computing device can transmit encoded images to a remote computing device to train a machine learning model and receive such a machine learning model for object detection of real-time images. Various other system architectures may include more or fewer features and/or may utilize the techniques described herein to achieve the results and outputs described herein. Therefore, the system depicted in FIG. 1 is a non-limiting example.

FIG. 1 illustrates a system 100, which includes components of an object detection system 105 for detecting objects within images captured by a camera attached to or integrated on or within a vehicle 110 as the vehicle 110 is moving or traveling. The system 100 can include the vehicle 110, the object detection system 105, and a cloud computing system 115. The object detection system 105 can include a computing device 120, a camera 125, and a communication interface 130. The object detection system 105 may include an alert device, such as an audio alarm, a warning light, or another type of visual indicator. The object detection system 105 can be mounted on a dashboard or other area inside the vehicle 110. The computing device 120 can include a computer storage 135, which can store an encoder 140, a decoder 145, and one or more machine learning models 150. The system 100 is not confined to the components described herein and may include additional or other components, not shown for brevity, which are to be considered within the scope of the embodiments described herein.

The vehicle 110 can be any type of vehicle, such as a car, truck, van, sport-utility-vehicle (SUV), motorcycle, semi-tractor trailer, or other vehicle that can be driven on a road or another environment. The vehicle 110 can be operated by a user, or in some implementations, can include a vehicle event detection system to monitor and improve driving behavior of an operator of the vehicle 110, an autonomous vehicle control system (not pictured) that navigates the vehicle 110 or provides navigation assistance to an operator of the vehicle 110.

The vehicle 110 can include the object detection system 105, which can be used to detect objects within images captured by the camera 125 when the vehicle is parked and/or as the vehicle is driving down a road. As outlined above, the object detection system 105 can include a computing device 120. The computing device 120 can be mounted on or in the vehicle 110. In some cases, the computing device 120 is a computing device that automatically controls the vehicle for self-driving. The computing device 120 can include at least one processor and a memory, (e.g., a processing circuit, etc.). The memory (e.g., the storage 135, other computer memory, etc.) can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), etc., or combinations thereof. The memory may include, but is not limited to, electronic, optical, magnetic, or any other storage or transmission device capable of providing the processor with program instructions. The instructions may include code from any suitable computer programming language.

The computing device 120 can include the storage 135, which can store images and/or video captured by the camera 125, an encoder 140, a decoder 145, and/or machine learning models 150. The machine learning models 150 can include one or more machine learning models, such as, but not limited, a neural network, a support vector machine, or a random forest. The storage 135 can be a computer-readable memory that can store or maintain any of the information described herein that is generated, accessed, received, transmitted, or otherwise processed by the computing device 120. The storage 135 can maintain one or more data structures, which may contain, index, or otherwise store each of the values, pluralities, sets, variables, vectors, numbers, or thresholds described herein. The storage 135 can be accessed using one or more memory addresses, index values, or identifiers of any item, structure, or region of memory maintained by the storage 135.

The storage 135 may be internal to the computing device 120 or may exist external to the computing device 120 and accessed via a suitable bus or interface. In some implementations, the storage 135 can be distributed across many different storage elements. The computing device 135 (or any components thereof) can store, in one or more regions of the memory of the storage 135, the results of any or all computations, determinations, selections, identifications, generations, constructions, or calculations in one or more data structures indexed or identified with appropriate values.

The computing device 120 can include or be in communication with a communication interface 130 that can communicate wirelessly with other devices. The communication interface 130 of the computing device 130 can include, for example, a Bluetooth communications device, a Wi-Fi communication device, or a 5G/LTE/3G cellular data communications device. The communication interface 130 can be used, for example, to transmit any information described herein to the cloud computing system 115, including encoded images that the computing device 120 receives from the camera 125. The communication interface 130 can also be used, for example, to receive one or more of the machine learning models 150 from the cloud computing system 115 or from another external computing system (e.g., receive the machine learning model 150 responsive to determining the machine learning model is sufficiently trained to detect objects within images).

The camera 125 can include any type of camera or multiple cameras that are capable of capturing images or videos of the environment surrounding the vehicle 110 and/or within the vehicle 110. The camera 125 may periodically capture images or video while the vehicle 110 is turned on and parked and/or as the vehicle 110 is moving. In some cases, the camera 125 can capture images or video when the vehicle 110 is turned off (e.g., when the vehicle is off but in a surveillance mode). The camera 125 may capture images or video and transmit the images or video to the computing device 120. The computing device 120 may receive the images and store images in the storage 135 and/or transmit the images to other vehicles or to the cloud computing system 115.

The cloud computing system 115 can be or include one or more computing devices that are configured to train and distribute machine learning models for object detection from images and/or similar tasks relating to real-time operation of a vehicle. The cloud computing system 115 may receive training images from computing devices of multiple vehicles and train an individual machine learning model to detect object within images from the training images. The cloud computing system 115 may train one or more machine learning models to do so and transmit the machine learning models (e.g., copies of the machine learning models) to computing devices of vehicles (e.g., the computing device 120) once the machine learning model or models are sufficiently trained. After transmitting the machine learning models to the computing devices, the cloud computing system 115 can continue to train a local (local to the cloud) version of the machine learning models with training images to improve the machine learning models and/or account for changes in new objects that appear in the environment and/or changes in the cameras that are capturing the images.

The cloud computing system 115 may use parallel processing techniques or have different computers perform different tasks to facilitate training and distribution of the machine learning models. For example, one computer of the cloud computing system 115 can establish connections with the computers of vehicles to receive images, another computer of the cloud computing system 115 can process (e.g., decode and/or resize) the received images, another computer of the cloud computing system 115 may present the training images to human labelers for labeling, another computer of the cloud computing system 115 can store and/or train the machine learning models with the labeled images, and another computer of the cloud computing system 115 can establish a connection with vehicles to transmit the machine learning models and updates (e.g., new versions) of the machine learning models to the computing devices of the vehicles. Any combination of one or more of the computers of the cloud computing system 115 may perform such processes. The computers of the cloud computing system 115 may do so using parallel processing techniques.

The camera 125 may include any number and any type of camera or video camera that can capture images or video of areas surrounding and/or inside the vehicle 110. The camera 125 can communicate with the computing device 120 via a vehicle interface, which may include a CAN bus or an on-board diagnostics interface. The camera 125 can capture images or video and transmit the captured images or video to the computing device 120. The computing device 120 can receive the captured images or video and transmit the images or video to the cloud computing system 115 to use to train a machine learning model for object detection and/or use the images or video as input into a trained machine learning model to detect objects within the images or video.

When transmitting the images (e.g., static images or images of a video) to the cloud computing system 115, the computing device 120 may first process the images. To do so, the computing device 120 may encode the images using the encoder 140. The encoder 140 may comprise instructions executable by one or more processors of the computing device 120 that cause the processor to encode images. The encoder 140 may encode the images into a new format (e.g., a compressed format). For example, the encoder 140 may encode the image by converting the image from a JPEG (or another image file, such as a WebP or PNG file) into an MP4 file. The encoder 140 may use any technique to convert the image into a compressed image. By doing so, the encoder 140 may reduce the file size of the images to reduce the bandwidth usage for transmitting the images across a network to the cloud computing system 115. The computing device 120 may transmit the encoded images to the cloud computing system 115 across a network via the communication interface 130.

The cloud computing system 115 may receive the encoded images and use the encoded images to train one or more machine learning models for object detection. For example, the cloud computing system 115 may include a decoder 155. The decoder 155 may be a software or a hardware decoder that is configured to decode (e.g., decompress) encoded images that the cloud computing system 115 receives from the computing device 120. The decoder 155 may be configured to decode encoded images by converting the encoded images into another file type, such as a PDF, JPEG, WebP, bitmap (BMP), or PNG file.

In some cases, encoding and decoding the images may introduce losses (e.g., semantic losses) in the images. For example, decoding an encoded image results in a decoded image that is substantially (but not exactly) the same image as the original image. Some pixels within the images may not be restored properly, particularly around edges of objects in the images. Thus, an encoded and then decoded image may have blurry edges compared with an initial raw version of the image.

The cloud computing system 115 may train machine learning models 160 with the decoded images. The machine learning models 160 may be neural networks, support vector machines, and/or random forests. The cloud computing system 115 may train the machine learning models 160 to detect objects within images with the decoded images. The cloud computing system 115 may do so by receiving labeled images from a reviewer and using back-propagation techniques and/or a loss function with the images on the machine learning models 160. In doing so, the cloud computing system 115 can train the machine learning models 160 to detect objects within encoded and then decoded images.

The cloud computing system 115 can transmit the machine learning model 150 to the computing device 120. The cloud computing system 115 can transmit the machine learning model 150 to the computing device 120 upon determining the machine learning model 150 is sufficiently trained. To do so, for example, the cloud computing system 115 may test the accuracy of the machine learning model 150 over time by comparing the output detected objects from images with labels of the images. The cloud computing system 115 can identify correct and/or incorrect predictions and determine the accuracy of the predictions as a percentage of the comparison. Alternatively, or in addition, the cloud computing system 115 can determine the localization accuracy of the predictions by, for example, computing an Intersection over Union (IoU) metric of predicted versus labeled bounding boxes. The cloud computing system 115 can transmit the machine learning model 150 (e.g., as a binary file) to the computing device 120, in some cases upon sufficiently training the machine learning model 150 (e.g., upon determining the accuracy of the machine learning model 150 exceeds a threshold). The computing device 120 may receive and store the machine learning model 150 in the storage 135.

The computing device 120 may use the machine learning model 150 for object detection while the vehicle 110 is operating. For example, when the vehicle 110 is parked and in surveillance mode or driving, the camera 125 may capture images of the area surrounding or inside the vehicle 110. The camera 125 may transmit the images to the computing device 120 across an electrical bus connected to the computing device 120 or across a network. The computing device 120 may receive the images and insert the images into the machine learning model 150. The computing device 120 may then execute the machine learning model 150 to extract objects (e.g., identifications of objects) from the images.

The computing device 120 can process images used for real-time object identification in a similar manner to how the training images are processed. For example, the computing device 120 may receive an image from the camera 125 of an object 165 in the middle of the road. The computing device 120 may encode the image by executing the encoder 140. The computing device 120 may encode the image in the same manner as the computing device 120 encoded images that the computing device 120 transmitted to the cloud computing system 115 for training. The computing device 120 may then decode the encoded image using the decoder 145, which may be a hardware or software decoder that is similar to the decoder 155 of the cloud computing system 115. The computing device 120 can then insert the decoded encoded image into the machine learning model 150 as an input. The computing device 120 can execute the machine learning model 150 to cause the machine learning model 150 to detect objects within the image. The computing device 120 may perform the encoding and decoding process for each image the computing device 120 receives from the camera 125. Because the computing device 120 encodes and decodes images in the same manner that the computing device 120 and cloud computing system 115 encode and decode training images to train the machine learning model 150, the machine learning model 150 may generate more accurate and predictable results when processing real-time data.

Figure 2:
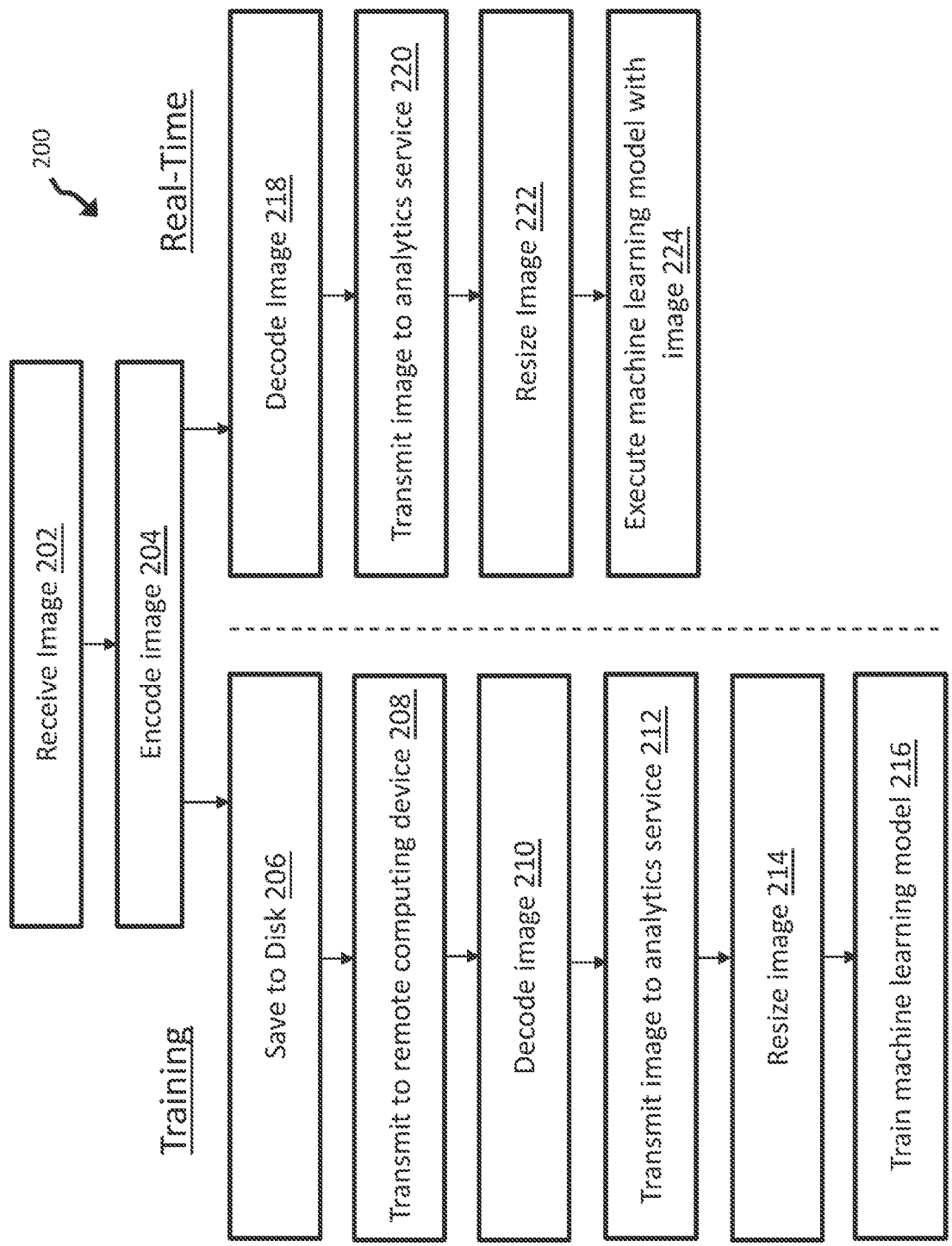
FIG. 2 illustrates a flow of a method for training a machine learning model for object detection, according to an embodiment.

FIG. 2 illustrates a flow of a method 200 executed by a data processing system (e.g., the object detection system 105) and a remote computing device (e.g., a cloud server or the cloud computing system 115) for detecting objects within images, in accordance with an embodiment. The method 200 includes steps 202-224. However, other embodiments may include additional or alternative steps, or may omit one or more steps altogether.

In step 202, the data processing system can receive an image. The image can be a JPEG, RAW, or another image file type. The image can be of a road or the area surrounding the vehicle or inside the vehicle. The image can be a standalone image or a frame of a video. The data processing system can receive the image from a camera attached to or inside the vehicle. The data processing system can receive the image as the vehicle is driving or when the vehicle is parked and/or operating in a standby mode. The data processing system can receive such images at defined intervals in the case of static standalone images or as the camera streams a video to the data processing system in a sequence of frames.

In step 204, the data processing system can encode the image. The data processing system can encode the image by executing a software or hardware encoder. In doing so, the data processing system can compress the image into a compressed file type, such as MP4. The data processing system can encode and/or compress the image in this manner to reduce the size of the image for when the data processing system transmits the image across a network, such as to the remote computing device. The data processing system can transmit the image to the remote computing device, for example, so the image can be used, by the remote computing device, to train a machine learning model to detect objects within images in combination with images the remote computing device receives from similar data processing systems of other vehicles. The data processing system can similarly encode each image the data processing system receives to transmit to the remote computing device to minimize the bandwidth that is used to transmit the images across the network.

In steps 206 and 208, the data processing system can save the encoded image to disk (e.g., to memory of the data processing system) and transmit the encoded image to a remote computing device. The data processing system can save the encoded image to disk to maintain a copy of the encoded image. Such can be advantageous, for example, if transmission of the image to the remote computing device fails or if a user of the data processing system wishes to view the image at a user interface. The data processing system can also transmit the encoded image to the remote computing device (e.g., a cloud server). The remote computing device can receive the encoded image to train a machine learning model to detect objects within images.

The data processing system can transmit a full sized version (e.g., 1080p) of the image to the remote computing device. The data processing system can do so because the images may be used for other reasons than for training machine learning model for object detection. For example, the remote computing device can store any images the remote computing device receives from the data processing system. The remote computing device can retrieve and use the images in a safety and coaching system in which the driving habits of drivers are analyzed from stored images (e.g., a sequence of images of a video).

In step 210, the remote computing device can decode the encoded image. The remote computing device can decode the encoded image by decompressing the encoded image. The remote computing device can do so using a software decoder or a hardware decoder. The remote computing device can decompress the encoded image into a JPEG image or another image format (e.g., a RAW format). In doing so, the remote computing device can recreate the original version of the image, in some cases with losses incurred from the encoding and decoding of the image.

In some cases, the remote computing device may use a software decoder to decode the encoded image. The software decoder may be software in a central processing unit of the remote computing device to decode the encoded image. While the software decoder may decode the image slower than a hardware decoder, the software decoder may have minimal impact on computer hardware configurations and/or may be easier to implement without affecting other aspects of the remote computing device. Because the remote computing device may only use the encoded and decoded images for model training (and not for real-time or near real-time inferences), decoding speed may not be as important, thus enabling the remote computing device to use a software decoder to decode the encoded image instead of a hardware decoder to avoid changing the hardware configuration of the remote computing device.

In step 212, the remote computing device can transmit the decoded encoded image to an analytics service. The remote computing device can transmit the decoded encoded image to the analytics service using a networking library. The analytics service may be a software program stored within the remote computing device or another computing device that can manipulate images and use the images to train machine learning models to detect objects within images. The analytics service can receive the image and, in step 214, process the image by resizing the image to a defined size. The analytics service can resize the image using a software resizer or a hardware resizer. For example, the analytics service can resize the image and any other images the analytics receives for training from 1080 vertical pixels to 360 vertical pixels. The analytics service can resize any image to use for training to a defined number of pixels to ensure the training data for the machine learning model is consistently formatted. By reducing the size of the images, the analytics service can minimize the number of pixels a machine learning model is trained to process, thus reducing the necessary training time for the machine learning model to be accurate to an accuracy threshold.

In some cases, the image may be labeled by reviewers (e.g., human reviewers) prior to or after resizing the image. Reviewers may label the image, for example, by drawing contours outlining objects within the image and/or selecting identifications of objects (e.g., identifications of types of objects, such as tree, human, pedestrian, person on a bike, stop light, stop sign, etc.) for such outlined objects. The reviewers may draw the contours and/or select identifications of objects manually by hand and upload the contoured image to the remote computing device or by contouring the images using contouring software on a local computing device.

In step 216, the remote computing device may train a machine learning model (e.g., a neural network, a support vector machine, random forest, etc.) with the contoured image and/or separate bounding boxes that indicate the locations of objects within training image data. The remote computing device may train the machine learning model to detect (e.g., identify and/or extract) objects from images. The remote computing device may train the machine learning model by feeding the contoured image into the machine learning model and executing the machine learning model to generate output predictions of objects within the image. In some cases, the output is a contoured version of the image with identifications of the objects that were contoured in the image. In some cases, the output comprises one or more indications of a bounding box. The remote computing device can compare the output contour of the image to the labels of the images and determine a difference between the output and the label. The remote computing device may use backpropagation techniques and a loss function based on the difference to adjust the parameters and/or weights of the machine learning model. The data processing system and the remote computing device may repeatedly perform the steps 202-216 to train the machine learning model.

The remote computing device can train the machine learning model until the machine learning model is accurate to a threshold (e.g., an accuracy threshold). For example, after executing the machine learning model to generate output labels for objects within an image, the remote computing device can calculate an accuracy of the machine learning model by comparing the output to the ground truth labels of the image. The remote computing device can calculate the accuracy as a percentage of correct predictions. The remote computing device can compare the accuracy to a threshold to determine if the machine learning model is sufficiently trained. The remote computing device can continuously determine the accuracy of predictions of labeled images over time until determining the machine learning model has an accuracy exceeding the threshold.

Upon determining the machine learning model has an accuracy exceeding the threshold, the remote computing device can transmit the machine learning model to the data processing system in the vehicle or a data processing system of another vehicle that similarly transmitted training data to the remote computing device and/or that is similarly configured with an appropriate hardware encoder and/or hardware decoder. The remote computing device may transmit the machine learning model as a binary file. The data processing system that receives the machine learning model can store the machine learning model in memory.

After receiving and storing the machine learning model from the remote computing device, the data processing system can use the machine learning model for real-time object detection in images. For example, the data processing system may repeat steps 202 and 204. In doing so, the data processing system may receive an image from the camera attached to the vehicle as the vehicle is driving or is parked. The data processing system can encode the image by compressing the image with an encoder (e.g., the same encoder the data processing system used to encode the training image described above).

In step 218, the data processing system can decode the encoded image. The data processing system can decode the encoded image using the same or similar techniques to the techniques the remote computing device used to decode the encoded image the remote computing device received from the data processing system. For example, the data processing system may decode the image by decompressing the image.

In some cases, the data processing system can decode the encoded image using a hardware decoder. The hardware decoder may be a hardware decoder (e.g., a video hardware decoder) that is integrated into a graphics processing unit (GPU) of the data processing system. An example of a hardware-based decoder is an NVDEC, which may provide fully-accelerated hardware-based video or image decoding. The hardware decoder may be or include a digital signal processing hardware decoder or an actual single-purpose hardware decoder. Although hardware decoders and software decoders may generate the same or substantially the same decoded images, the hardware decoder may have a faster decoding speed than the software decoder that can be used to decode images at the remote computing device. Accordingly, it may be advantageous to use a hardware decoder to decode images on the vehicle to enable the data processing system to more quickly detect objects in real-time images to generate or transmit alerts or information about such detected objects to the vehicle.

In some cases, the data processing system can select encoded images to decode from the encoder. For example, the data processing system can receive multiple images from the camera (e.g., multiple frames of a video from the camera) over time. The data processing system can encode each of the images. The data processing system can apply one or more selection rules to determine which encoded images to select (e.g., tap) for object detection. For instance, the data processing system can apply a rule indicating to select encoded images at a set interval (e.g., every fifth image). The data processing system can maintain and increment a counter after detecting or identifying each encoded image. Upon determining the counter reaches the end of the set interval (e.g., the counter equals 5 and the set interval is set to 5), the data processing system can retrieve and decode the encoded image that caused the counter to reach the end of the interval. The data processing system can reset the counter and continue repeating this process, retrieving and decoding encoded images from the encoder at the set interval.

In step 220, the data processing system can transmit the decoded encoded image to an analytics service. The data processing system can transmit the decoded encoded image to the analytics service using a networking library. The analytics service may be a software program stored within the data processing system or another computing device that can manipulate images to use the images to detect objects within the images. The analytics service can receive the decoded encoded image and, in step 222, process the image by resizing the image to a defined size. For example, the analytics service can resize the image to the same size as the images that were used to train the machine learning model (e.g., resize the image from 1080 vertical pixels to 360 vertical pixels). The analytics service can resize the image using the same software resizer as the remote computing device, another software resizer, or a hardware resizer. The analytics service may do so to ensure the machine learning model receives images that are the same size as the images on which the machine learning model was trained.

The software analytics services of the data processing system and the remote computing device can resize images. This can be advantageous compared with cases in which the remote computing device resizes training images using a software resizer and the data processing system resizes images using a hardware resizer. In such cases, the resizing algorithms may be different and can cause a difference in floating point units between the two resizers, as many happen, for example, if the software resizer uses floating point logic but the hardware resizer uses fixed point logic. In some cases, the analytics service of the data processing system and the remote computing device can be the same analytics service (e.g., the analytics service in each device may utilize a consistent set of floating point and fixed point logic blocks). By using a software resizer in the analytics service of the data processing system and the remote computing device, the difference in floating point units may be minimized (if different) or removed (if identical), thus improving the accuracy and reducing loss during resizing.

In some cases, the data processing system can resize the image using a hardware resizer. By doing so, the data processing system can resize the image in the GPU. Doing so may enable the data processing system to resize the image faster than with a software resizer, which may enable the images to be processed in real-time for object detection. This can be important when the data processing system is used for autonomous driving or to generate alerts indicating an upcoming object to a driver.

In step 224, the data processing system executes the machine learning model with the resized image. The data processing system can do so by inserting the resized image into the machine learning model and executing the machine learning model. Executing the machine learning model may cause the machine learning model to output or extract objects from the image, such as by contouring the image, locating bounding boxes around detected objects within the image, and/or by generating identifications of the objects within the image. Because the image the machine learning model analyzed was processed (e.g., encoded and decoded) in the same manner as the images that were used to train the machine learning model, the machine learning model may more accurately detect objects within the image than if the image was a raw image that was not previously processed.

The data processing system may receive and process images as the vehicle is driving. For example, the camera mounted on or in the vehicle can capture images as the vehicle is driving. The data processing system can receive such captured images and encode and decode the captured images. The data processing system may then execute the machine learning model to extract a set of objects from the decoded image. The set of objects may be or include identifications and/or contours of objects and/or bounding boxes surrounding objects within the decoded image. The data processing system may perform each of these steps in real-time as the vehicle is driving.

The data processing system can implement the systems and methods described herein to aid the vehicle in autonomously driving. For example, upon executing the machine learning model with the decoded image to obtain the set of extracted objects, the data processing system can identify the set of extracted objects. The data processing system can apply a set of vehicle action rules to the set of extracted objects. The vehicle action rules may include rules that correspond to changes in operation of the vehicle (e.g., change in speed, change in direction, change in a power state, etc.) to implement if the vehicle action rules are satisfied. The vehicle action rules may include rules indicating that if certain objects are detected in an image or a sequence of images (e.g., consecutive images of a video) and/or if certain objects are in particular locations of an image or a sequence of images, a vehicle action rule is satisfied. Upon extracting the set of objects from a decoded image, the data processing system may apply the vehicle action rules to the extracted set of objects. The data processing system may determine a vehicle action rule is satisfied and identify a change in operation of the vehicle that corresponds to the vehicle action rule (e.g., has a stored association with the vehicle action rule in memory of the data processing system). Upon identifying the change in operation of the vehicle, the data processing system may implement (e.g., automatically implement) the change in operation of the vehicle.

In some cases, instead of implementing the change in operation of the vehicle, the data processing system may transmit an identification of the change in operation to a processor operating the vehicle. The processor may receive the identification and change operation of the vehicle according to the identification. The data processing system and processor may perform these operations in real-time as the vehicle is driving down a road, thus facilitating self-driving of the vehicle.

Advantageously, by performing the processing and execution steps in real-time, the data processing system may use the extracted set of objects to aid the driver and/or the vehicle in driving. For example, the data processing system may detect a pedestrian crossing the road in front of the vehicle using the processing techniques described herein. Based on the detection, the data processing system may transmit an alert (e.g., a visual or audio alert) to the vehicle or another computing device that indicates to the driver of the vehicle of the upcoming pedestrian such that the driver can maneuver the vehicle to avoid the pedestrian. The receiving vehicle or computing device may display the alert on a user interface or emit audio of the alert to indicate the upcoming pedestrian to the driver. In some cases, the vehicle may receive the alert and automatically veer around the pedestrian. In some cases, the data processing system can control the vehicle by changing the operation of the vehicle to cause the vehicle to veer around the pedestrian and/or transmit a change in operation signal to the vehicle to cause the vehicle to automatically veer around the pedestrian.

Figure 3A:
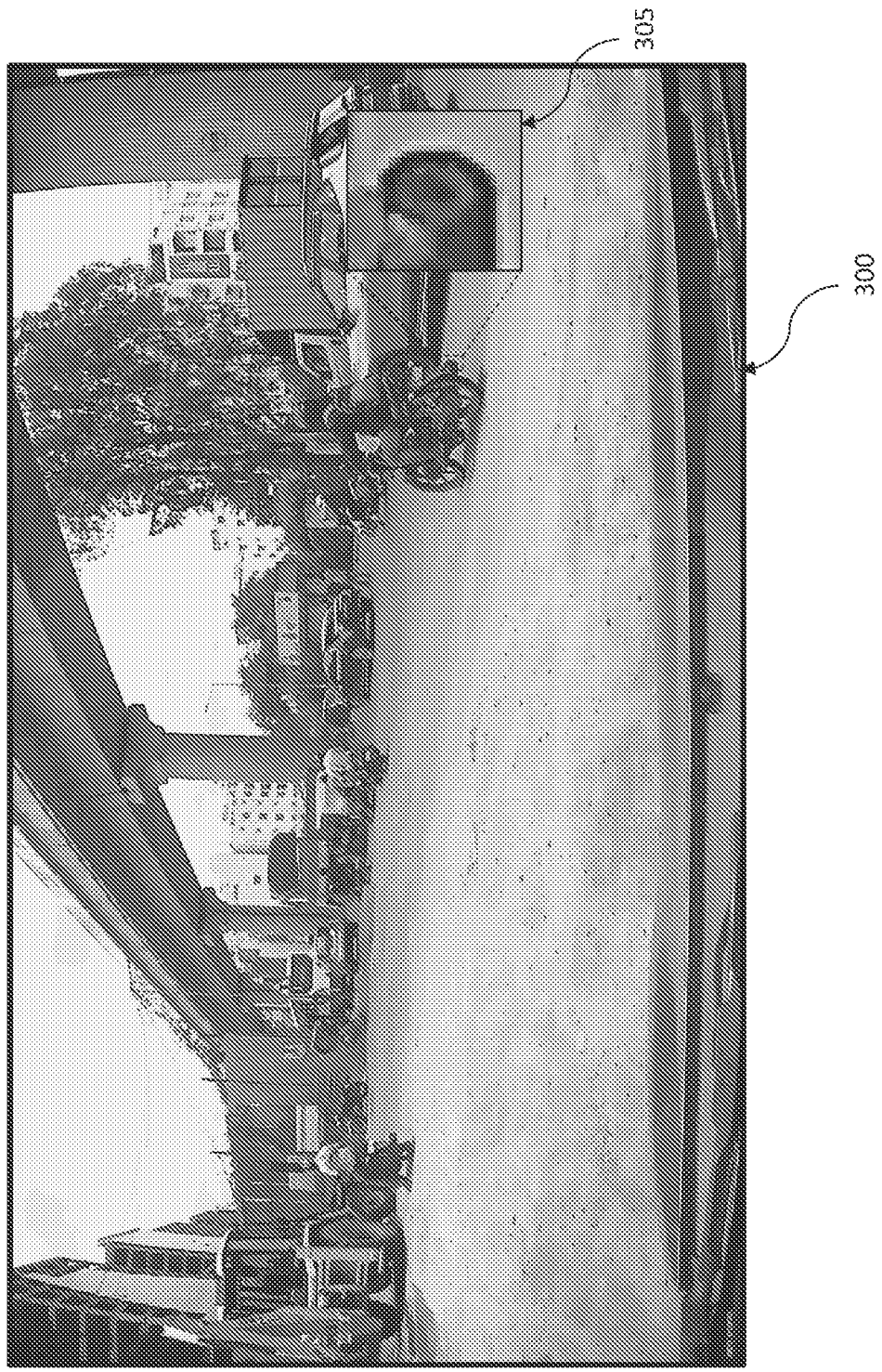
FIG. 3A shows a raw image, according to an embodiment.
Figure 3B:
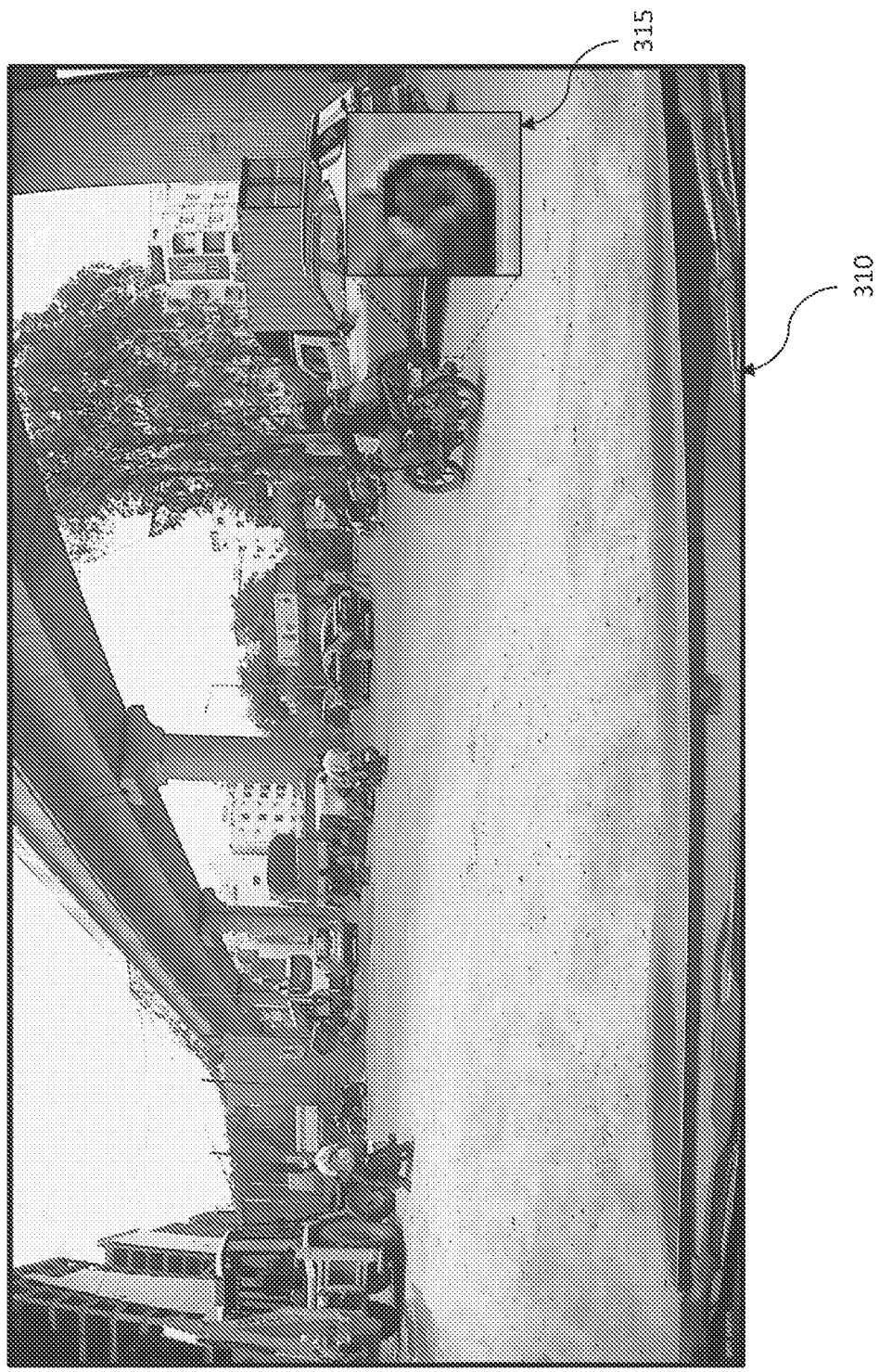
FIG. 3B shows a decoded version of an encoded version of the raw image shown in FIG. 3A, according to an embodiment.
Figure 3C:
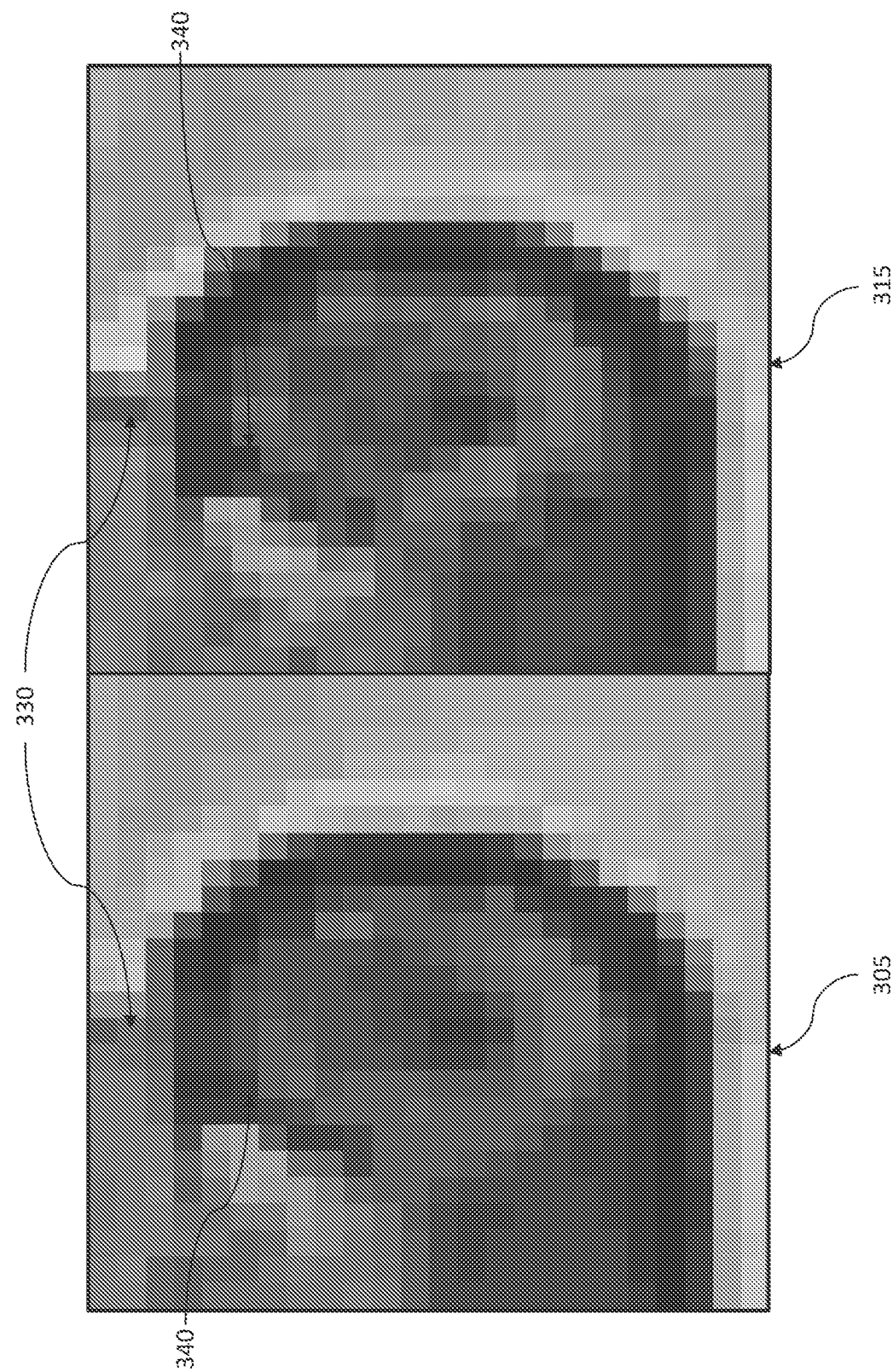
FIG. 3C shows an image highlighting the differences between the raw image (FIG. 3A) and the decoded encoded version of the raw image (FIG. 3B), according to an embodiment.

FIG. 3A shows a raw image 300 that is an image captured by a camera (e.g., the camera 125) mounted or within a vehicle 110. The raw image 300 may be in any format, such as JPEG or RAW. FIG. 3A further depicts a zoomed-out portion of the image 300 (see, 305) depicting the exhaust of a motorcycle. FIG. 3B shows a decoded encoded version 310 of the raw image 300. FIG. 3B further shows a zoomed-out portion of the image 310 (see, 315) depicting the exhaust of the motorcycle. FIG. 3C shows the zoomed-out portions 305 and 315 placed adjacent to one another. FIG. 3C further shows the differences in values of pixels that are common in images 305 and 315 (see, 330 and 340).

The raw image 300 is encoded at the computing device 120 placed in the vehicle. The encoded image is then transmitted to the remote computing device (i.e., cloud computing system 115) to reduce the utilization of bandwidth. The encoded image is decoded at the remote computing device and the decoded encoded image is used to train a machine learning model. The machine learning model is trained to identify objects in the decoded encoded image. Even though the decoded encoded image 310 may look similar to the raw image 300 for a human eye, the differences can be seen at pixel level. These differences in pixel values play a major role in the inaccurate identification of the objects in the images by the machine learning model and may make the machine learning model, which is trained on decoded encoded images, unreliable for identification of objects from a raw image. For example, the zoomed-out portions 305 and 315 in FIG. 3C highlight the pixel value differences (see, 330 and 340) between raw image 300 and decoded encoded image 310. In order to improve the accuracy of the machine learning model and to make the model reliable, it is advantageous to convert the raw images to decoded encoded images before providing the images to the machine learning model when the model has been trained on decoded encoded images.

Figure 4:
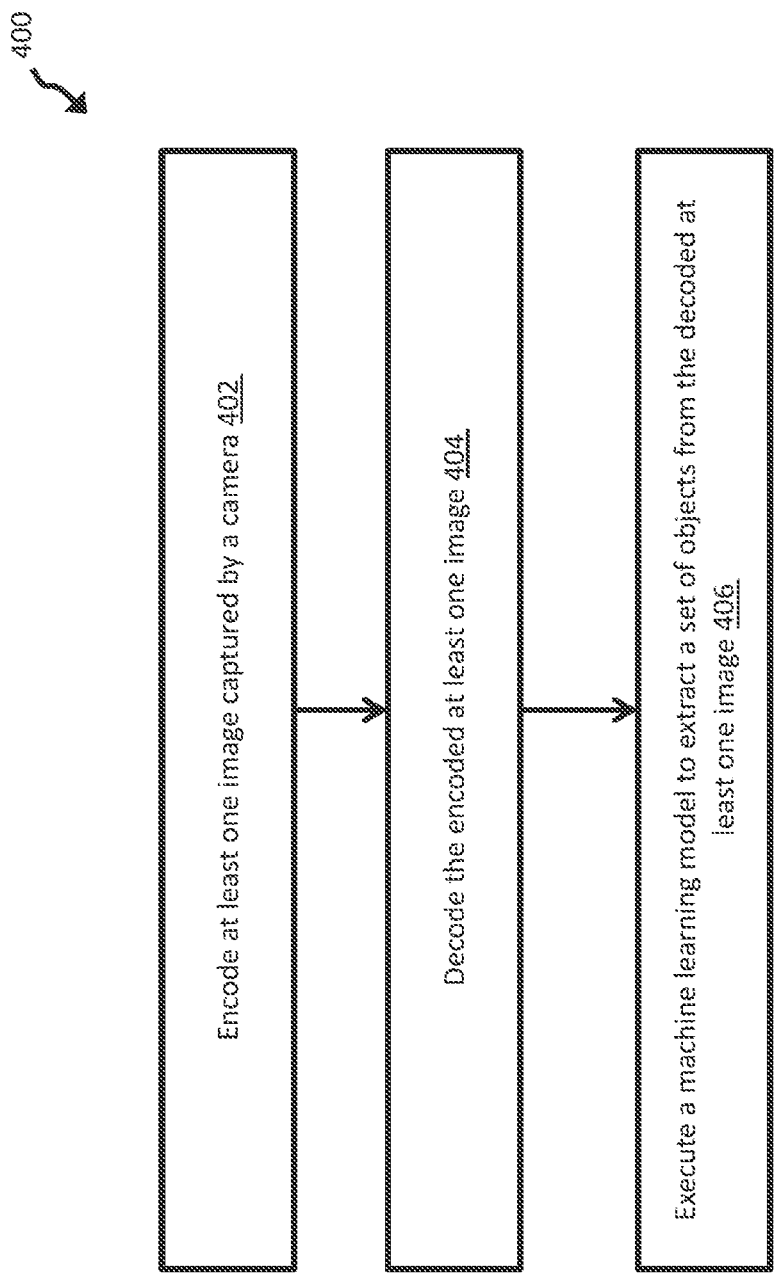
FIG. 4 illustrates a flow of a method for training a machine learning model for object detection, according to an embodiment.

FIG. 4 illustrates a flow of a method 400 executed by a data processing system (e.g., the object detection system 105, the cloud computing system 115, combinations thereof, etc.) for training a machine learning model for object detection, according to an embodiment. The data processing system may perform the method 400 subsequent to receiving a machine learning model that was trained by a computing device remote to a vehicle by receiving a decoded set of previously encoded training images (e.g., training image data) and training the machine learning model to detect objects within images based on the decoded set of training image data. The method 400 may include steps 402-406. However, other embodiments may include additional or alternative steps, or may omit one or more steps altogether.

In step 402, the data processing system may encode at least one image captured by a camera. The camera may be attached to or coupled with a cabin of the vehicle. The data processing system may encode the at least one image by compressing the at least one image into a new file format. In step 404, the data processing system may decode the encoded at least one image. The data processing system can decode the encoded at least one image by decompressing the compressed at least one image. In step 406, the data processing system can execute a machine learning model. The data processing system can execute the machine learning model to extract a set of objects from the at least one image. Because the machine learning model was trained based on encoded and decoded training images similar to the real-time (encoded and decoded) at least one image, the machine learning model may more accurately extract objects from the at least one image.

FIG. 5 illustrates a flow of a method 500 executed by a data processing system (e.g., the object detection system 105, the cloud computing system 115, combinations thereof, etc.) for training a machine learning model for object detection, according to an embodiment. The method 500 may include steps 502-512. However, other embodiments may include additional or alternative steps, or may omit one or more steps altogether.

In step 502, the data processing system may encode at least one first image captured by a camera mounted on or in a vehicle. In step 504, the data processing system may transmit the encoded at least one first image to a remote computing device remote from the data processing system. The remote computing device or another computing device may decode the encoded at least one first image and train a machine learning model to extract objects within images with the decoded at least one first image. In step 506, the data processing system may receive the machine learning model from the remote computing device. The data processing system may receive the machine learning model after the remote computing device trains the machine learning model by decoding the encoded images from the data processing system and training the machine learning model with the decoded images and/or similarly decoded encoded images from data processing system of other vehicles. In step 508, the data processing system may encode at least one second image captured by the camera mounted to or in the vehicle. In step 510, the data processing system may decode the encoded at least one second image. In step 512, the data processing system may execute the machine learning model to extract a set of objects from the decoded at least one second image.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The operations described in this specification can be implemented as operations performed by a data processing apparatus on data stored on one or more computer-readable storage devices or received from other sources.

The terms "data processing apparatus", "data processing system", "client device", "computing platform", "computing device", "computing system", "user device", or "device" can encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, a digital camera device, a video camera device, or a portable storage device (e.g., a universal serial bus (USB) flash drive), for example. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD monitor, for displaying information to the user; a keyboard; and a pointing device, e.g., a mouse, a trackball, or a touchscreen, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices described herein can each be a single module, a logic device having one or more processing modules, one or more servers, or an embedded computing device.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an imple-mentation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for training and implementing a machine learning model for object detection, wherein a first computing device remote to a vehicle trained the machine learning model by receiving a decoded set of previously encoded training image data; changing a size of each of the decoded set of training image data from a first number of pixels to a second number of pixels; and training the machine learning model to detect objects within images based on the decoded set of training image data in the second number of pixels, the method comprising:

encoding, by at least one processor of a second computing device in communication with a camera mounted on or in the vehicle, at least one image captured by the camera;

decoding, by the at least one processor, the encoded at least one image;

changing, by the at least one processor, a size of the decoded at least one image from the first number of pixels to the second number of pixels; and executing, by the at least one processor, the machine learning model to extract a set of objects from the decoded at least one image in the second number of pixels.

2. The method of claim 1, wherein the first computing device trained the machine learning model by decoding the encoded set of training image data from a compressed format into a decompressed format, and wherein:

encoding the at least one image comprises encoding, by the at least one processor, the at least one image into the compressed format; and decoding the encoded at least one image comprises decoding, by the at least one processor, the encoded at least one image into the decompressed format.

3. The method of claim 1, wherein the first computing device trained the machine learning model by decoding the encoded set of training image data using a software decoder, and wherein decoding the encoded at least one image comprises decoding, by the at least one processor, the encoded at least one image using a hardware decoder.

4. The method of claim 1, wherein the first computing device trained the machine learning model by changing the size of each of the decoded set of training image data using a first software resizer, and wherein changing the size of the encoded at least one image comprises changing, by the at least one processor, the size of the encoded at least one image using the first software resizer, a second software resizer, or a hardware resizer.

5. The method of claim 1, wherein executing the machine learning model comprises executing, by the at least one processor, the machine learning model to extract a set of objects from the decoded at least one image in real time as the vehicle is driving.

6. The method of claim 1, wherein receiving the at least one image from the camera comprises receiving, by the at least one processor, a video comprising a plurality of images including the at least one image, and wherein decoding the at least one image comprises decoding, by the at least one processor, the at least one image in response to selecting the at least one image from the plurality of images according to one or more selection rules.

7. The method of claim 6, wherein selecting the at least one image according to the one or more selection rules comprises selecting, by the at least one processor, the at least one image by identifying the at least one image at a set interval of images in the plurality of images.

8. The method of claim 1, further comprising:
determining, by the at least one processor, a change in vehicle operation of the vehicle based on the extracted set of objects; and
transmitting, by the at least one processor, the change in vehicle operation of the vehicle to a second processor controlling the vehicle, the second processor controlling the vehicle according to the change in vehicle operation.

9. The method of claim 1, wherein the second computing device is mounted on or in the vehicle.

10. A system for training and implementing a machine learning model for object detection, the system comprising
a remote processor of a first computing device remote from a vehicle, the remote processor coupled to a remote non-transitory memory of the first computing device, wherein the remote processor is configured to:
receive an encoded set of training image data;
decode the encoded set of training image data;
change a size of each of the decoded set of training image data from a first number of pixels to a second number of pixels; and
train a machine learning model to detect objects within images based on the decoded set of training image data; and
an on-board processor of a second computing device in communication with an on-board non-transitory memory of the second computing device and a camera mounted on or in the vehicle, wherein the on-board processor of the second computing device is configured to:
encode at least one image captured by the camera;
decode the encoded at least one image;
change a size of the decoded at least one image from the first number of pixels to the second number of pixels; and
execute the machine learning model to extract a set of objects from the decoded at least one image in the second number of pixels.

11. The system of claim 10, wherein the remote processor is further configured to transmit the machine learning model to the on-board processor across a network.

12. The system of claim 10, wherein the remote processor is further configured to transmit the machine learning model to the on-board processor responsive to determining the machine learning model has an accuracy above an accuracy threshold on decoded input data.

13. The system of claim 10, wherein the remote processor is configured to:
decode the encoded set of training image data by decoding the encoded set of training image data from a compressed format into a decompressed format, and
wherein the on-board processor is configured to:
encode the at least one image by encoding the at least one image into the compressed format; and
decode the encoded at least one image by decoding the encoded at least one image into the decompressed format.

14. The system of claim 10, wherein the remote processor is configured to decode the encoded set of training image data using a software decoder, and
wherein the on-board processor is configured to decode the encoded at least one image by decoding the encoded at least one image using a hardware decoder.

15. The system of claim 10, wherein the on-board processor is further configured to:
receive the at least one image from the camera mounted on or in the vehicle as the vehicle is driving down a road,
wherein the on-board processor is configured to encode the at least one image by encoding an image including a depiction of the road.

16. A method for training and implementing a model for object detection, comprising:
encoding, by at least one processor of a computing device in communication with a camera mounted on or in a vehicle, at least one first image captured by the camera;
transmitting, by the at least one processor, the encoded at least one first image to a remote computing device remote from the at least one processor, the remote computing device or a second computing device decoding the encoded at least one first image, changing, a size of the decoded at least one first image from a first number of pixels to a second number of pixels; and
training, with the decoded at least one first image, a machine learning model to extract objects within images in the second number of pixels;
receiving, by the at least one processor, the machine learning model from the remote computing device or the second computing device;
encoding, by the at least one processor, at least one second image captured by the camera coupled to the vehicle;
decoding, by the at least one processor, the encoded at least one second image;

change a size of the decoded at least one second image from the first number of pixels to the second number of pixels; and executing, by the at least one processor, the machine learning model to extract a set of objects from the decoded at least one second image in the second number of pixels.

17. The method of claim 16, wherein encoding the at least one first image comprises encoding, by the at least one processor, the at least one first image by executing an encoder, and wherein encoding the at least one second image comprises encoding, by the at least one processor, the at least one second image by executing the encoder.

18. The method of claim 16, wherein receipt of the encoded at least one first image causes the remote computing device to decode the encoded at least one first image from a compressed format into a decompressed format, and wherein:

encoding the at least one second image comprises encoding, by the at least one processor, the at least one second image into the compressed format; and decoding the encoded at least one second image comprises decoding, by the at least one processor, the encoded at least one second image into the decompressed format.

19. The method of claim 16, wherein receipt of the encoded at least one first image causes the remote computing device to decode the encoded at least one first image using a software decoder, and wherein decoding the encoded at least one second image comprises decoding, by the at least one processor, the encoded at least one second image using a hardware decoder.

* * * * *